(12) United States Patent
Brehob

(10) Patent No.: US 6,798,081 B1
(45) Date of Patent: Sep. 28, 2004

(54) ENERGY-EFFICIENT AND ENVIRONMENTALLY HELPFUL POWER CONVERSION SYSTEM AND METHOD

(76) Inventor: Richard Brehob, 1128 E. Cameron St., Indianapolis, IN (US) 46203

( * ) Notice: Subject to any disclaimer, the term of this patent is extended or adjusted under 35 U.S.C. 154(b) by 0 days.

(21) Appl. No.: 10/462,112

(22) Filed: Jun. 16, 2003

(51) Int. Cl.⁷ ................................................ F03B 13/10
(52) U.S. Cl. ............................ 290/43; 290/54; 417/334
(58) Field of Search ............................... 290/42, 43, 53, 290/54; 417/331, 334

(56) References Cited

U.S. PATENT DOCUMENTS 3,930,168 A * 12/1975 Tornabene .................. 290/53
4,355,511 A * 10/1982 Jones ........................ 60/507
6,392,314 B1 * 5/2002 Dick ........................... 290/53

* cited by examiner

Primary Examiner—Nicholas Ponomarenko
(74) Attorney, Agent, or Firm—Daniel O'Connor

(57) ABSTRACT

A high-efficiency energy conversion system and method which is able to use a low volume air flow source such as a vacuum cleaner to turn a drive means and generate rotary energy. The system and method includes a water-filled container and a drive means which is selectively made more or less buoyant at various points of rotation. The system includes leverage arms and balloon elements. It may be made of smaller components for domestic use or larger components for an industrial-type usage.

6 Claims, 5 Drawing Sheets

ENERGY-EFFICIENT AND ENVIRONMENTALLY HELPFUL POWER CONVERSION SYSTEM AND METHOD

BACKGROUND AND OBJECTS OF THE INVENTION

The present invention is generally related to the energy conversion arts and, in particular, to a novel high-efficiency energy conversion system and method.

Prior art energy production and conversion systems typically use wind or tide energy as the primary driving force for a rotating element. While effective, such systems have not found widespread use in the art because of the costs involved and the particular geographic locations required for such wind or tidal systems. They have not found practical use for the typical homeowner.

Accordingly, it is an object of the present invention to set forth an energy conversion system and method which may be used by a typical homeowner for electrical energy or other power production. The system disclosed is not dependent upon the availability of naturally occuring wind or tidal forces.

It is a further object of the invention to demonstrate an energy conversion system which may be driven by a low power fluid flow energy source such as a vacuum cleaner or other equivalent means.

It is also an object of the invention to show an energy conversion system which efficiently utilizes buoyancy principles in a closed system to generate torque and consequent power production.

It is a still further object of the invention to set forth an energy conversion system which may be economically produced for widespread commercial appeal and which may be used, for example, to generate electrical power which may be sold to a power company. The device may be used in-home without reliance on naturally occuring winds or tides.

These and other objects and advantages of the disclosed invention will be apparent to those of skill in the art from the descriptions and drawings contained herein.

PRIOR ART PATENTS AND DESIGNS

The prior art patents related generally to the present invention were reviewed in U.S. Patent Office Class 60 pertaining to power plants and Class 290 related to prime mover systems and methods.

U.S. Pat. No. 3,993,913 shows a typical tidewater power system which uses a rotating wheel configuration to generate electrical or other power. This system, as with other tidal or windmill-type generators, requires a particular geographic location which is not often available for a typical homeowner.

Numerous other tidal and windmill generators are also shown in the prior art.

The present invention discloses numerous mechanical elements and methods which are not shown in the prior art. Accordingly, the design is believed to be clearly novel and patentable under the laws of the United States as set forth in U.S. Code, Title 35.

SUMMARY OF THE INVENTION

A drive combination assembly means is described and includes a central hub element, a disc which rotates around the hub, plural flow pipe elements positioned on the rotating disc and specifically configured balloon elements attached to the flow pipe elements.

The drive assembly is placed in a water-filled tank or container.

A flow of air is introduced to the hub area and the air flow causes the balloons to be inflated at a lower point of rotation to create a buoyant or lifting effect. The balloons are deflated at an upper point of rotation to reduce drag on the rotating subassembly.

Output from the rotating disc member is directed to, for example, a pulley which may be used to generate electrical power. A high-efficiency energy generation method which can be used by a typical homeowner to generate surplus power is shown.

BRIEF DESCRIPTION OF THE DRAWING FIGURES

FULL DESCRIPTION OF A PREFERRED EMBODIMENT

Figure 1:
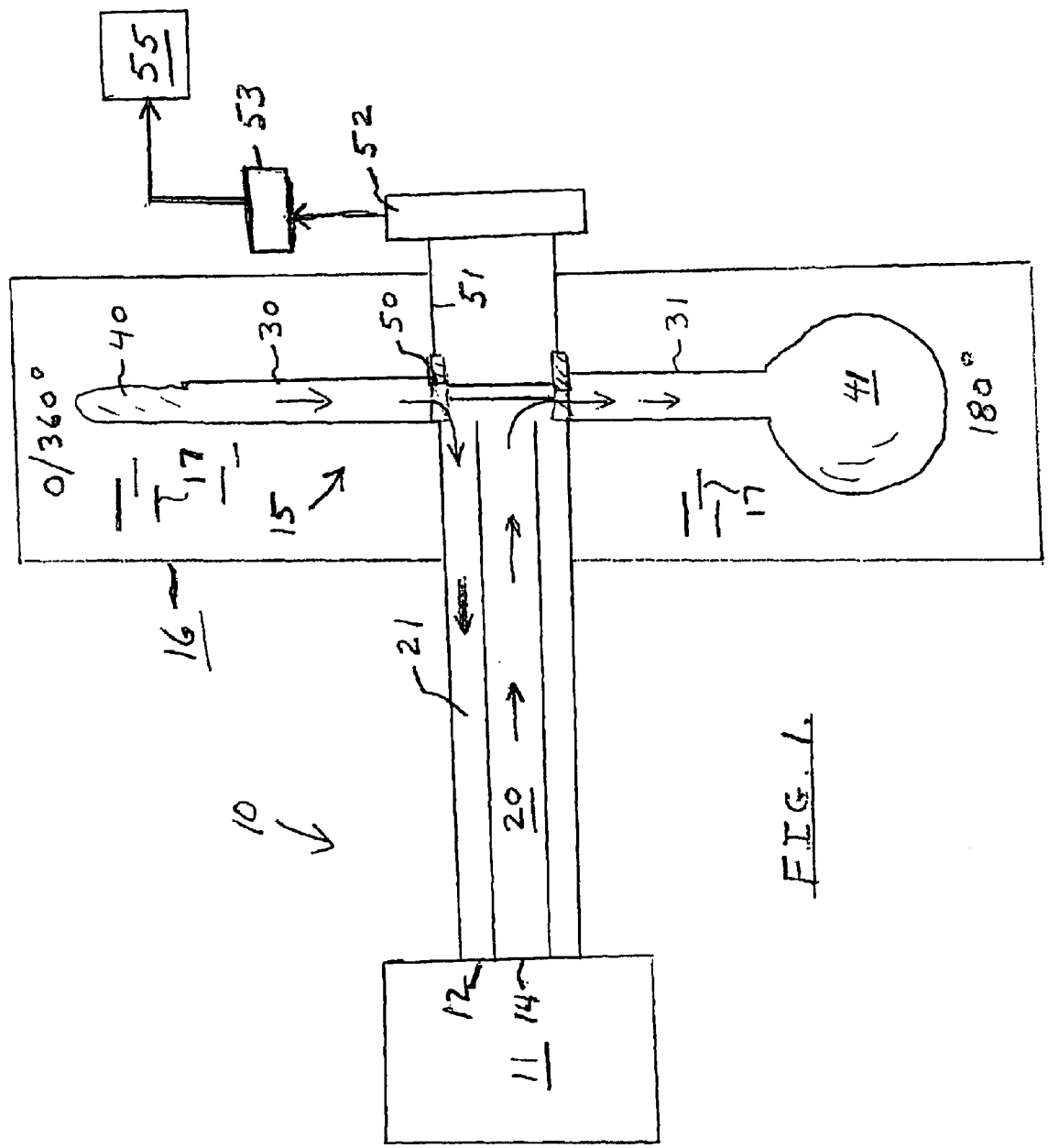
FIG. 1 is a side schematic view of a major portion of the overall system.

Referring to the schematic drawing FIG. 1, the overall system 10 is shown to include an air supply and return source 11 such as a vacuum cleaner.

The air source includes inflow and outflow ports 12 and 14 respectively.

Air is supplied to a drive assembly 15 which includes a hub-ring-disc subassembly shown at numeral 50 and to be later described.

The drive assembly 15 further includes a plurality of leverage arms or flow pipes 30, 31 et cetera and a plurality of balloons 40, 41 et cetera. See also FIG. 2.

The drive assembly 15 is contained within a water tank 16 substantially filled with water 17.

Output from the hub-ring-disc subassembly 50 is used to turn element 51 and pulley 52 which in turn drives a generator 53 which supplies power to a house-hold or grid system 55.

Figure 2:
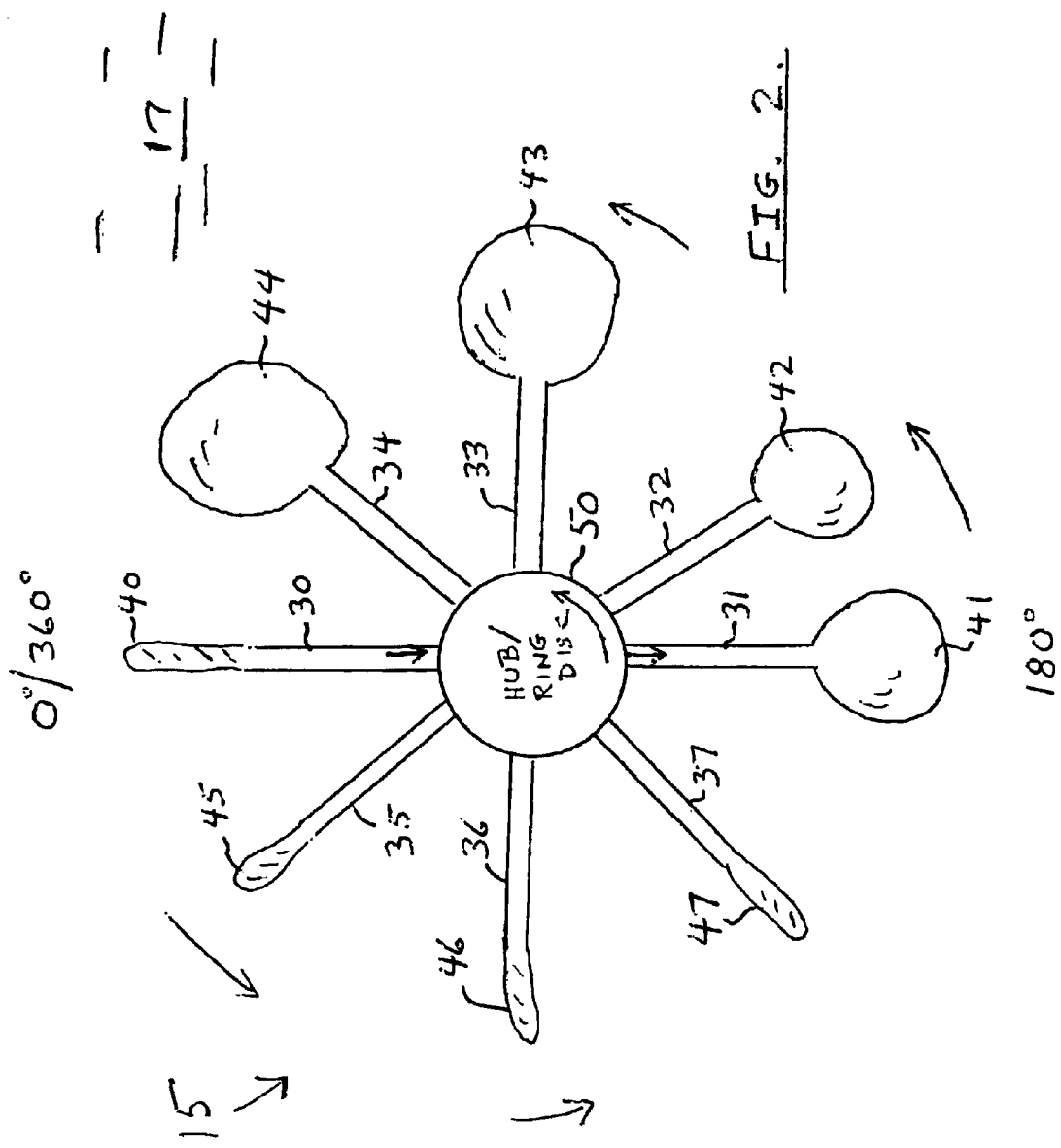
FIG. 2 is a view of the drive assembly including the leverage arms and balloon elements as they rotate in a counterclockwise direction.

As shown in FIG. 2, the drive assembly 15 is turned in a counterclockwise fashion by means of the inflation and deflation of a number of balloons 40–47.

The balloons are mounted to a series of leverage arms or flow pipes shown at 30 to 37.

As indicated in FIG. 2, each balloon is inflated at a lower 180 degree point by means of air flowing through an attached pipe. Each balloon is deflated at an upper 0 or 360 degree point by reason of air flowing back to the air source 11 in FIG. 1.

Thus, since the drive assembly 15 is submerged in water 17, a lifting or buoyant force is created to turn the drive assembly and an attached disc in the counterclockwise direction.

Each of the leverage arms 30–37 are attached to a central rotatable disc to be later described.

The particular balloon configuration used in the invention will be also later described.

Figure 3:
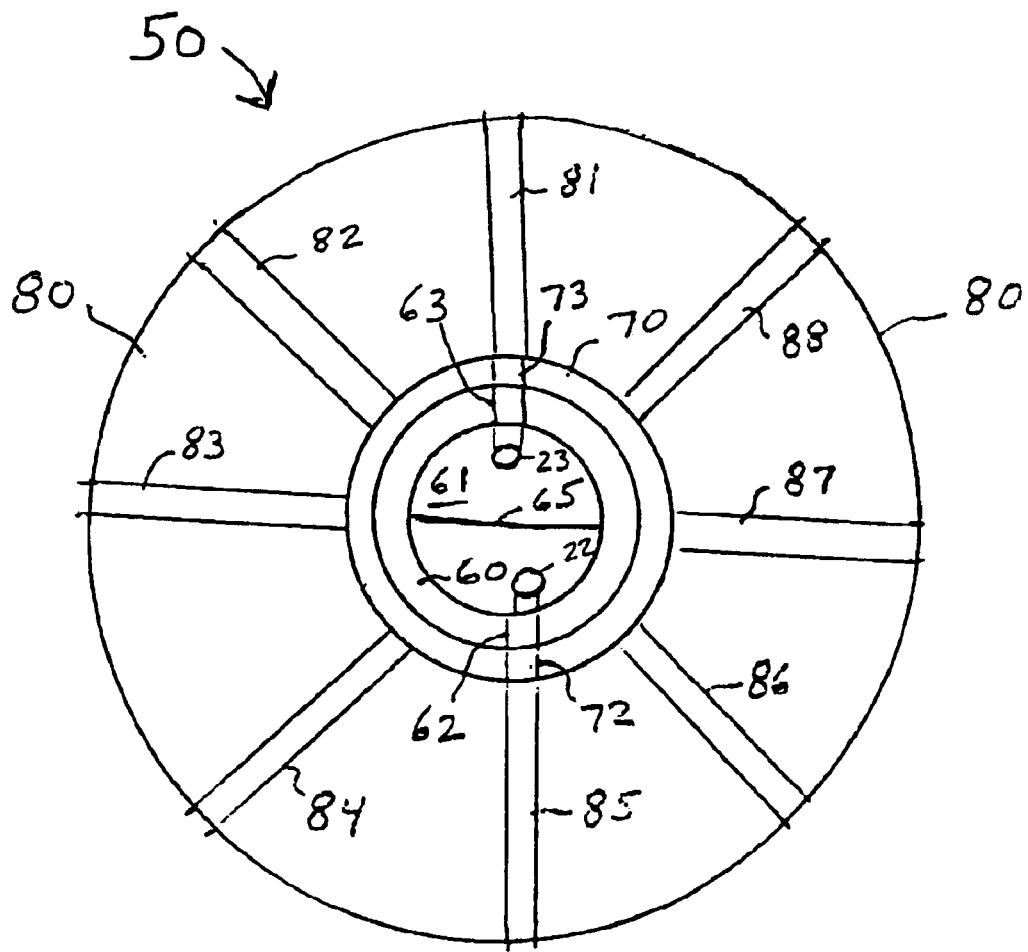
FIG. 3 is a schematic view of a hub, ring and disc subassembly which is positioned at a central part of the drive assembly.

The hub-ring-disc subassembly 50 is broadly indicated in FIGS. 1 and 2 and is illustrated in the cross-sectional detail of FIG. 3.

Referring to FIG. 3, a central fixed hub element 60 has an open area 61. Air supply to the hub is indicated at numeral 22. Air removal from the hub area is indicated at numeral 23.

The hub 60 has a lower air supply port 62 formed therein and an upper air removal port 63 also formed therein.

Positioned around the hub 60 is a nylon ring element 70. Ring 70 has a lower air supply port 72 and an upper air removal port 73 formed therein.

A disc 80 is rotatably positioned around the fixed hub and ring elements.

The disc 80 has a number of apertures and flow ports 81 to 88 formed therein. These apertures allow air flow and the positioning of leverage arms 30–37 which were previously described.

Various hub configurations and flow paths may be utilized for air supply and air removal. For example, a central divider 65 may be included to provide a lower high pressure/air supply area and an upper low pressure/air removal area.

Figure 4:
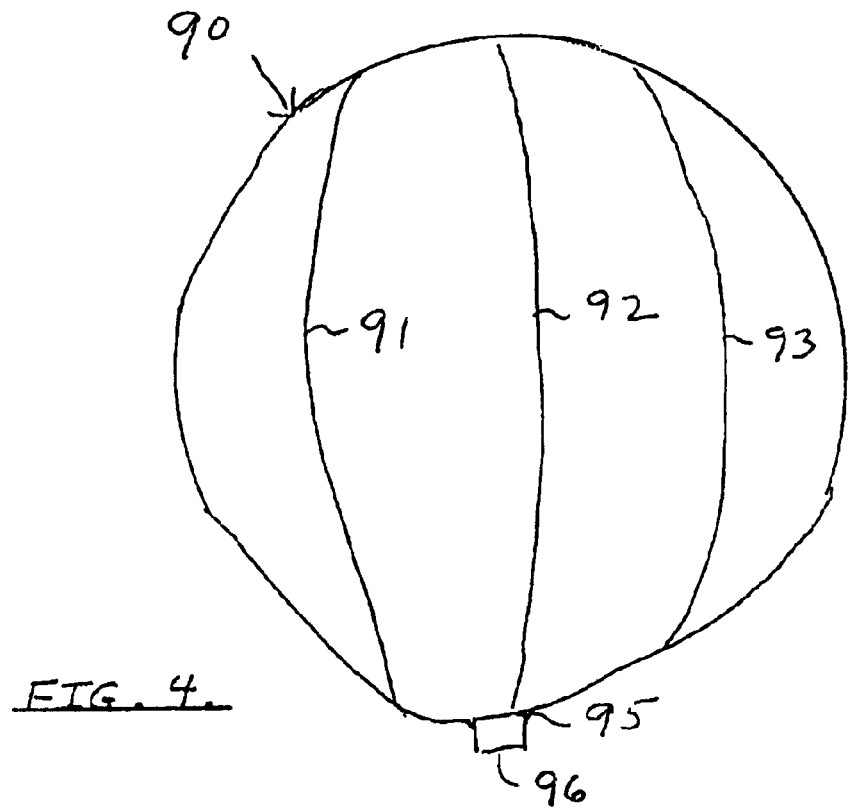
FIGS. 4 and 5 are expanded and contracted views of the balloon elements used in the invention.

FIG. 4 shows an expanded balloon configuration at 90. The balloon 90 may be fabricated of durable and expandible rubber materials designed to accomodate a submerged-in-water operation.

Figure 5:
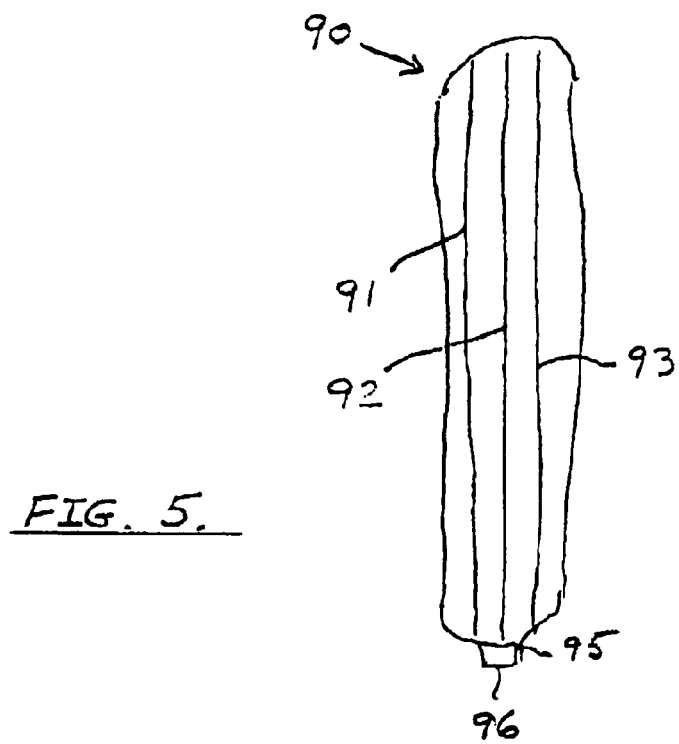

The balloon 90 has a number of seams formed therearound as indicated at numerals 91 to 93. Such seams allow the balloon to readily collapse when needed and yet still retain an upright position as shown in FIG. 5.

The balloons 90 may include a lower extended portion 95 to enable it to be clamped at 96 to an end of a leverage arm.

The balloon configuration is important since it permits the rapid expansion and low-drag contraction shown in FIG. 2.

The method steps used in practical operation of the invention are as follows:

a) providing a low-power air supply and air return from a source indicated at numeral 11, b) providing a drive assembly 15 positioned within a water-filled chamber 16, c) providing that the drive assembly 15 includes plural leverage arms and balloon elements attached thereto, d) providing a drive subassembly including fixed hub and ring elements 60 and 70 and an outer rotatable disc element 80, e) providing a pulley or gear element 52 located outside the water-filled chamber 16, f) rotating the pulley or gear to efficiently generate power for use in a home or for supply to a power grid.

The overall design allows a low-power domestic vacuum cleaner or hair dryer to be used in a highly efficient power generating manner.

Figure 6:
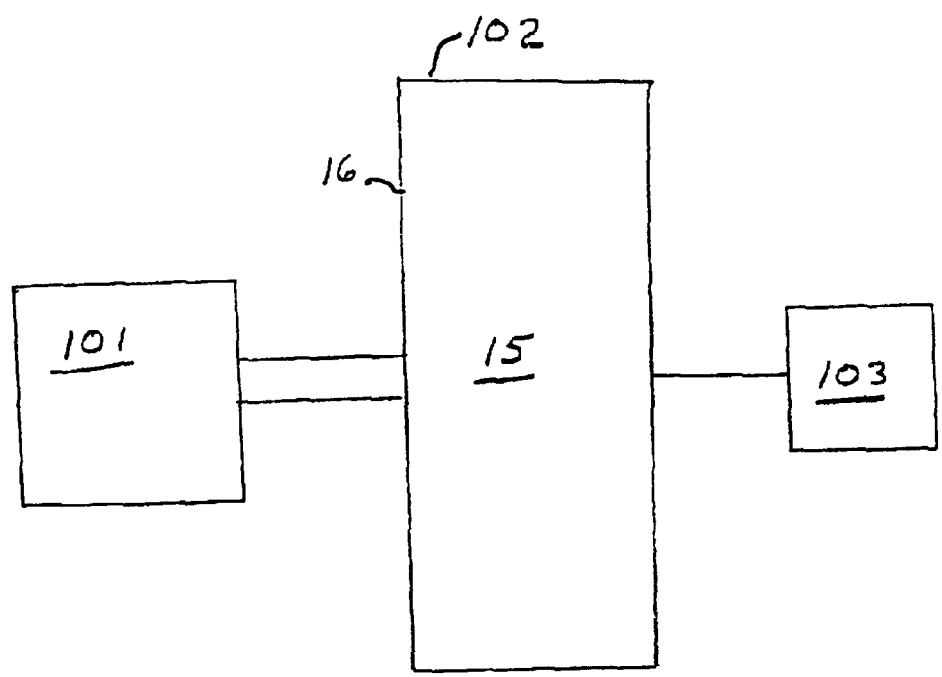
FIG. 6 is a block diagram of the broader method steps utilized to create rotary or pulley operation from a low flow air source.

FIG. 6 indicates the broader method steps used in the invention. Numeral 101 represents a low flow air source such as a vacuum cleaner or a hair dryer. Numeral 102 signifies a rotary drive means 15 within a water-filled container which includes balloon elements and leverage arms. Numeral 103 represents a pulley or gear-turning output which may be used, for example, to generate electricity.

It is intended in this specification to cover all equivalent systems and methods which would reasonably occur to those of skill in the art. For example, in one variation of the invention, the exiting air flow need not return to the air source but may instead be vented to the atmosphere.

Equivalent systems and methods are as defined in the statutes and patent case law of the United States.

The invention is further defined by the claims appended hereto.

I claim:

1. An energy conversion system comprising:

an air supply means(11) for directing air to a container (16), said container being at least partially filled with water(17), a drive assembly means(15) positioned in said container for receiving a supply of air, said drive assembly including a plurality of leverage arm means(30–37) for receiving a flow of air, said drive assembly further including a plurality of balloon elements(40–47), said balloon elements being selectively inflated and deflated to provide for rotation of said drive assembly, said drive assembly further including a central subassembly comprising a hub(60), a ring(70) and a disc(80) wherein said hub and ring elements are in a fixed position and said disc is rotatable to drive a pulley(52) external of said container(16).

2. The energy conversion system of claim 1 wherein said hub(60) includes a central area(61) for receipt of an inflow (22) and an outflow(23) of air, said hub including a first lower aperture means(62) for supplying air to said balloon elements and a second upper aperture means for removing air from said balloon elements.

3. The energy conversion system of claim 2 wherein said ring(70) includes a first lower aperture means(72) for supplying air to said balloon elements and a second upper aperture means(73) for removing air from said balloon elements.

4. The energy conversion system of claim 3 wherein said disc(80) is rotatable about said ring(70) and wherein said disc has a plurality of aperture means formed therein for receipt of said leverage arms and wherein said balloon elements have seams(91–93) to provide for an easy collapsing and expansion thereof.

5. A Method of converting energy in the form of an air flow to energy in the form of a rotating pulley comprising the steps of:

a) supplying air to a container which is at least partly filled with water and which includes a relatable drive assembly, b) rotating said drive assembly by means of said supplied air, c) turning said pulley by means of the output from said drive assembly, d) wherein said drive assembly includes plural balloon elements and plural leverage arms.

6. The method of claim 5, wherein said drive assembly includes a subassembly comprising stationary hub and ring elements and a rotatable disc element for supporting said leverage arms.

* * * * *